United States Patent [19]
Bienert et al.

[11] 3,806,584
[45] Apr. 23, 1974

[54] PROCESS FOR PRODUCING CARBON-FREE, SATURATED BORON-NITROGEN-HYDROGEN COMPOUNDS

[75] Inventors: Klaus Bienert; Winfried Lang, both of Burghausen, Upper Bavaria, Germany; Josef Priller, Ach/Salzach, Austria

[73] Assignee: Wacker-Chemitronic Gesellschaft fur Elektronik-Grundstoffe m.b.H., Burghausen-Off, Germany

[22] Filed: Aug. 25, 1970

[21] Appl. No.: 66,860

[30] Foreign Application Priority Data
Aug. 27, 1969 Germany.............................. 1943581

[52] U.S. Cl.................. 423/285, 423/290, 117/106
[51] Int. Cl. ..... C01b 6/22, C01b 6/20, C01b 35/00
[58] Field of Search........................ 23/358; 423/285

[56] References Cited
OTHER PUBLICATIONS
Gerrard, "The Organic Chemistry of Boron," 1961, page 12.

Horn et al., "Journal Of The American Chemical Society," Vol. 78, pages 5772–5773 (1956).

Niedenzu, "Boron–Nitrogen Chemistry," 1964, page 192.

Martin, "Chemical Reviews," Vol. 42, pages 581–591 (1948).

Richter, "Textbook Of Organic Chemistry," 2nd Edition, 1943, page 196.

Primary Examiner—M. Weissman
Attorney, Agent, or Firm—Allison C. Collard

[57] ABSTRACT

A process for producing carbon-free, saturated boron-nitrogen-hydrogen compounds of the empirical formula $BN_{3-x}H_{6-3}$, where $0 \leq x < 2$, from boron compounds and ammonia, which comprises reacting ammonia with boric acid alkyl esters of alcohols with one to four carbon atoms in the vapor phase at a temperature of 20° to 700° C.

2 Claims, No Drawings

PROCESS FOR PRODUCING CARBON-FREE, SATURATED BORON-NITROGEN-HYDROGEN COMPOUNDS

It is known that the conversion of boric acid trimethyl esters in ethereal solution results besides the additive product $B(OCH_3)_3NH_3$ in a series of polymer products with the empirical formula $[(CH_3O)_3B-NH_2-B(OCH_3)_2]_n$. It has also been described previously that during reactions of boron halides with ammonia, boron amides are formed, and at elevated temperatures borimides. There, depending on the temperature, reaction period and incidental local concentration conditions, mixtures of boron-nitrogen-hydrogen compounds with various mol concentrations are created, whose emperical formula is given as $BN_{3-x}H_{6-3x}$, $0 < x < 2$. These products may still contain small quantities of chlorine which may have a disturbing effect during their use. Moreover, cleaning and keeping the prehalides used as starting substances clean is difficult due to the great corrosive effect of these compounds.

We have now discovered a process for producing boron-nitrogen-hydrogen compounds with the empirical formula $BN_{3-x}H_{6-3x}$, $0 < x < 2$, from boron compounds and ammonia. The process is characterized by the fact that boric acid alkyl esters of alcohols with one to four carbon atoms, preferably boric acid trimethyl ester, are used, and the reaction is carried out in the vapor phase at temperatures from 20° to 700° C, preferably 100° to 500° C.

According to the invention, the reaction is carried out in such a manner that, contrary to the data in the literature, all alkoxy groups are substituted immediately, so that carbon-free boron-nitrogen-hydrogen compounds are created. Depending on the conditions of conversion, compounds of varying compositions are created, but they can all be characterized by the empirical formula $BN_{3-x}H_{6-3x}$. When using lower temperatures, particularly room temperature, and short reaction periods, a product results that contains mainly $BN_3H_6$. There $x$ represents a number that is only slightly larger than 0. If the temperature is increased and/or the reaction period is lengthened, the product splits off ammonia, creating higher molecular compounds. Thereby the figure $x$ increases up to the limit value 2 which would mean pure boron nitride.

A particularly suitable starting substance is the boric acid trimethyl ester. There even at higher conversion temperatures (500° to 700° C) the decomposition products of methanol that result are only the non-troublesome gases: carbon monoxide and hydrogen. On principal it is also possible to work with esters of alcohols with more than four carbon atoms, but it does not seem to be advantageous for technical reasons.

The boric acid esters are produced in accordance with known methods, e.g., from boric acid and alcohol in the presence of concentrated sulphuric acid. There one obtains mostly ester mixtures that contain alcohol, whose separation could require considerable technical apparatus because of the frequently similar boiling points of the alcohol and the ester. However, according to the present invention it is also possible to use the alcohol-containing ester mixtures. This is the reason for the great economy of our claimed process.

When carrying out the process of the invention, reaction gases are piped in and gaseous conversion products are piped off. Therefore it is particularly practical to carry out the reaction in an open system. Such a system is for instance a pipe or tube which on one side is equipped with two or more nozzle openings for the separate input of ammonia and boric acid alkyl esters, and on the other side with a gas outlet which should be equipped with a suitable closure to prevent the air from coming in. The boric acid alkyl ester can be carried in by vaporizing and blowing in a steam jet or by carrying the vaporized ester in a stream of inert gas, for example noble gas or hydrogen, preferably nitrogen.

Also it is possible to perform the reaction under pressure, using a throttle, where the air is definitely prevented from leaking in and a greater throughput is achieved. In closed vessels only limited quantities can be converted, but these may be increased by using pressure vessels.

Boric acid alkyl ester and ammonia are generally used in a molar proportion of 1:2 to 1:7, preferably 1:3 to 1:4. In order to obtain a completely oxygen-free product it is useful to use ammonia in excess, and a molar proportion between boric acid alkyl ester and ammonia of 1:4 has been found to be favorable.

By the process of the invention one obtains every time a mixture of various boron-nitrogen-hydrogen compounds whose composition is not known exactly. Only the empirical composition formula can be determined by analysis. The product is distinguished by great purity and it can therefore be used to great advantage for producing extremely pure boron nitride. It is conveyed into reaction vessels which have been heated to a higher temperature and there it splits off ammonia, creating boron nitride films or layers. Such processes are of particular interest, for instance, for rendering the semiconductor surfaces inactive as well as for structural elements, and for making boron nitride crucibles.

EXAMPLE

Into a quartz pipe 1 m long with a diameter of 50 mm, which in its front part has been heated to 200° C at a length of 20 cm, ammonia streams in through two separate nozzles at a speed of 3 liters/minute, and at 40° C a stream of nitrogen saturated with boric acid trimethyl ester at a speed of 4 liters/minute. The exhaust gases are carried off through an excess pressure valve. In the cooler part of the pipe a white crystalline boron-nitrogen-hydrogen compound condenses with a gross composition of $BN_{2.88}H_{5.64}$. With the aid of infrared photographs it was established that the substance no longer contains a carbon-oxygen bond or a carbon-hydrogen tie.

The yield, referred to boric acid trimethyl ester, is 83 percent.

The invention claimed is:

1. Process for producing carbon-free boron-nitrogen-hydrogen compounds of the emperical formula $BN_{3-x}H_{6-3x}$, where $0 < x < 2$, from boron compounds and ammonia, which comprises reacting ammonia with boric acid alkyl esters of alcohols with one to four carbon atoms in a molal proportion of boric acid alkyl ester to ammonia between 1:2 and 1:7 in the vapor phase at a temperature of 100° to 500° C.

2. Process according to claim 1, in which said boric acid alkyl ester is boric acid trimethyl ester.